(12) United States Patent
Chui et al.

(10) Patent No.: US 10,803,250 B2
(45) Date of Patent: Oct. 13, 2020

(54) CONTROL OF MESSAGE TRANSMISSION

(71) Applicant: International Business Machines Corporation, Armonk, NY (US)

(72) Inventors: Hin Ting Chui, Richmond Hill (CA); Jarett Stein, Bryn Mawr, PA (US); Meaghan Vella, Markham (CA); Tony B. Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/110,366

(22) Filed: Aug. 23, 2018

(65) Prior Publication Data

US 2020/0065381 A1 Feb. 27, 2020

(51) Int. Cl.
*G06F 40/30* (2020.01)
*H04L 12/58* (2006.01)
(52) U.S. Cl.
CPC ............ *G06F 40/30* (2020.01); *H04L 51/063* (2013.01)
(58) Field of Classification Search
None
See application file for complete search history.

(56) References Cited

U.S. PATENT DOCUMENTS

| 7,890,860 B1 | 2/2011 | Thrasher et al. | |
|---|---|---|---|
| 2010/0198931 A1* | 8/2010 | Pocklington | G06Q 10/107 709/206 |
| 2010/0223581 A1* | 9/2010 | Manolescu | G06Q 10/00 715/853 |
| 2013/0253910 A1 | 9/2013 | Turner et al. | |
| 2013/0311485 A1 | 11/2013 | Khan | |

(Continued)

FOREIGN PATENT DOCUMENTS

WO 2015184013 A1 7/2015

OTHER PUBLICATIONS

Zaino, Jennifer. "Sentiment Intelligence in the Workplace: Watch Your Corporate Tone!" Dataversity Education, LLC., dataversity.net, Jun. 22, 2011. <http://www.dataversity.net/sentiment-intelligence-in-the-workplace-watch-your-corporate-tone/>.

(Continued)

*Primary Examiner* — Clayton R Williams
*Assistant Examiner* — Christopher B Robinson
(74) *Attorney, Agent, or Firm* — Law Office of Jim Boice

(57) ABSTRACT

A managing computer receives a proposed outgoing message that has been created for proposed transmission to one or more recipients. The managing computer determines a respective tone associated with one or more respective parts of the proposed outgoing message, and determines a probable interpreted tone of the one or more respective parts as perceived by the one or more recipients. In response to determining a difference between the respective tone and the probable interpreted tone for the one or more respective parts of the proposed outgoing message, the managing computer changes the one or more respective parts of the proposed outgoing message in order to create a modified outgoing message, where the probable interpreted tone for the one or more recipients of the modified outgoing message matches a sender-intended tone for the modified outgoing message. The managing computer then transmits the modified outgoing message to the one or more recipients.

17 Claims, 9 Drawing Sheets

(56) References Cited

U.S. PATENT DOCUMENTS

| | | | |
|---|---|---|---|
| 2013/0346067 A1* | 12/2013 | Bhatt | G06F 40/30 |
| | | | 704/9 |
| 2014/0188459 A1 | 7/2014 | Fink et al. | |
| 2015/0242391 A1 | 8/2015 | Goel et al. | |
| 2015/0264146 A1 | 9/2015 | Cudak et al. | |
| 2016/0147731 A1* | 5/2016 | Parikh | H04L 67/30 |
| | | | 715/261 |
| 2018/0103491 A1* | 4/2018 | Sundman | H04W 74/0816 |

OTHER PUBLICATIONS

P. Mell et al., "The NIST Definition of Cloud Computing", National Institute of Standards and Technology, Information Technology Laboratory, Sep. 2011, pp. 1-7.

* cited by examiner

DEAR SIR: I AM VERY ANGRY ABOUT MY PROBLEM. ⟵ 204

DEAR SIR: I AM SOMEWHAT ANGRY ABOUT MY PROBLEM. ⟵ 202

DEAR SIR: I UNDERSTAND YOUR POINT, BUT AM STILL CONCERNED ABOUT MY PROBLEM. ⟵ 206

FIG. 2

CONTROL OF MESSAGE TRANSMISSION

BACKGROUND

The present invention relates to the field of messaging systems, and particularly to messaging systems that broadcast messages having certain tones and sentiments. Still more particularly, the present invention relates to controlling message transmissions according to their tone and sentiment.

SUMMARY

In one or more embodiments of the present invention, a managing computer receives a proposed outgoing message that has been created, by a sender, for transmission to one or more recipients. The managing computer determines a respective tone associated with one or more respective parts of the proposed outgoing message, and determines a probable interpreted tone of the one or more respective parts as perceived by the one or more recipients. In response to determining a difference between the respective tone and the probable interpreted tone for the one or more respective parts of the proposed outgoing message, the managing computer changes the one or more respective parts of the proposed outgoing message in order to create a modified outgoing message, where the probable interpreted tone for the one or more recipients of the modified outgoing message matches a sender-intended tone of the one or more respective parts of the modified outgoing message. The managing computer then transmits modified outgoing message to the one or more recipients.

In one or more embodiments, the method described above is implemented as a computer program product and/or a computer system.

BRIEF DESCRIPTION OF THE DRAWINGS

FIG. 2 illustrates an exemplary proposed outgoing message being changed into one or more modified outgoing messages in accordance with one or more embodiments of the present invention;

DETAILED DESCRIPTION

Figure 1:
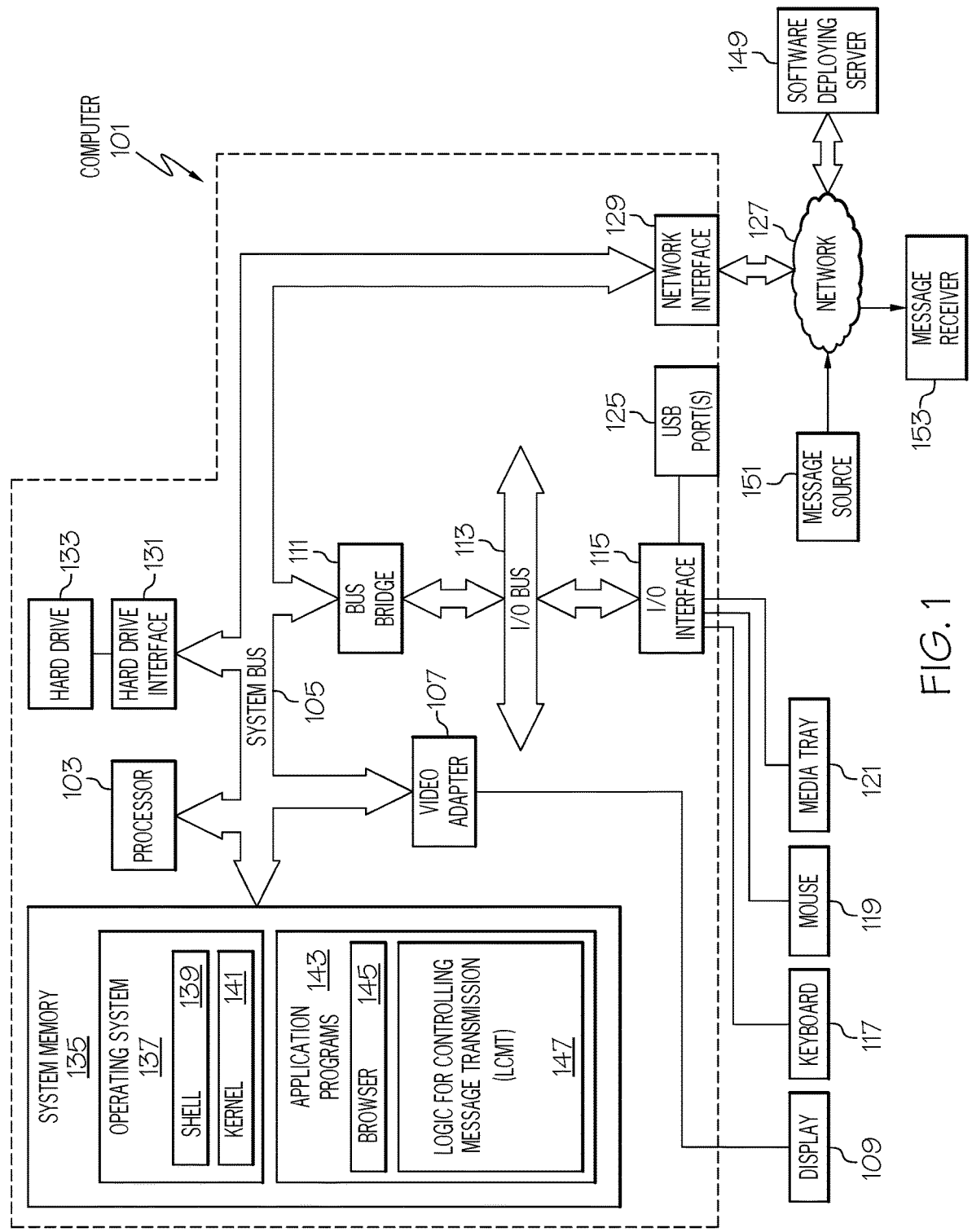
FIG. 1 depicts an exemplary system and network in which the present disclosure is implemented in one or more embodiments.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

As used herein, the term "tone" is a descriptor of a specific aspect of a "sentiment" found in a document, such as a letter, an email, a text message, etc. "Sentiment" is defined herein as an overall tone of the document. For example, an email has an overall "sentiment" of being unpleasant, due to one or more passages in the email that convey "tones" of anger, disgust, fear, etc.

Messages, including email messages, text messages, radio broadcast messages, etc., are often composed in a manner such that the intended (and thus portrayed) sentiment/tone do not match the intended sentiment/tone. That is, an author of the message may intend to convey a certain sentiment of being happy about some issue discussed in the message, but when received and read by the recipient, it is interpreted as being angry, due to various scenarios described herein.

In one or more embodiments of the present invention, a message is written so that different parts of the message portray differing sentiments/tones, thus resulting in a certain overall sentiment. That is, the author may intend for a certain passage to convey that the author is upset about one issue, but another passage may (intentionally) convey that the author is pleased about another issue.

Thus, one or more embodiments of the present invention present a way to understand sentiments/tones in a proposed message, to know which sections of the proposed message need to be modified in order to comport with the author's desired sentiment/tone, and to make modifications to the proposed message in order to create a modified message that 1) comports with the author's desired sentiment/tone, but also 2) will be understood by a particular recipient as expressing the author's desired sentiment/tone.

As such, one or more embodiments of the present invention present a system to 1) scan a proposed outgoing message; 2) determine the sentiment/tone of parts of the proposed outgoing message; 3) determine what the intended sentiment of the message is based on the profile of the author/sender, the topic of the message, and a situational awareness of positive or negative activities leading up to the message (e.g., the message sender and recipient just closed a sale, just received a support escalation, etc.); 4) determine a probable interpreted sentiment of the message based on a message recipient list, role(s) of the message recipient(s), location(s) of the message recipient(s), ages of the message recipient(s), profile attributes (education, etc.) of the message recipient(s), etc.; 5) propose changes to the message to modify the proposed outgoing message so it expresses the desired sentiments, which in one or more embodiments of the present invention are different for varying sections of the message; 6) provide visualization of which parts of the message should be changed to reflect the author's intended sentiment/tone; 7) make changes to the proposed outgoing message in order to create a modified outgoing message that will be interpreted by the recipient as reflecting the author's intended sentiment/tone for the message; and 8) enable transmission of the modified outgoing message to the particular recipient(s).

As such, one or more embodiments of the present invention ensure that the sentiment/tone for sections of a message match the intent of the author/sender.

In one or more embodiments, the author/sender creates settings of tones that are intended to be expressed in the message. In various embodiments of the present invention, this is based on a combination of the intentions of the sender and the nature of the message.

Thereafter, the author starts writing a proposed draft of the message. The system then evaluates the overall sentiment of the message based on phrases and paragraphs in the message, and then provides alternative phrases that change the tone of the message, in order to better portray the original intended tones/sentiment of the author/sender as intended for a particular recipient or group of recipients of the message.

For example, assume that a user wants to send a client an email. Professional message meeting corporate guidelines require that the email be devoid of angry or aggressive tones. As such, the first paragraph of the email would be apologetic, the second analytical, and the third confident. Thus, the present invention scans the email to determine the overall sentiment of the email, based on the tones found in the email, in order to determine if it matches the author's original intended sentiment.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or a message source 151 and/or a message receiver 153 shown in FIG. 1, and/or a computer 501 and/or a message selector device 503 and/or a message receiver 553 shown in FIG. 5.

In one or more embodiments of the present invention, exemplary computer 101 includes a processor 103 that is coupled to a system bus 105. Processor 103 utilizes one or more processors, each of which has one or more processor cores. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. A such, computer 101 and/or message source 151 and/or message receiver 153 are devices capable of transmitting and/or receiving messages.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Controlling Message Transmission (LCMT) 147. LCMT 147 includes code for implementing the processes described below, including those described in FIGS. 2-7. In one embodiment, computer 101 is able to download LCMT 147 from software deploying server 149, including in an on-demand basis, wherein the code in LCMT 147 is not downloaded until needed for execution. In one embodiment of the present invention, software deploying server 149 performs all of the functions associated with the present invention (including execution of LCMT 147), thus freeing computer 101 from having to use its own internal computing resources to execute LCMT 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention analyze communication messages in order to determine a tone and sentiment of the text in the message. One or more embodiments of the present invention have the ability to sort through text and give the sentiment of sections of the entire text by breaking down various sentiments throughout the whole body of text. Thus, the system determines the overall sentiment of the whole document. This allows the system to generate alternative phrases or words in the message in order to provide the correct and intended tone of communication for the message.

For example, assume that the system (e.g., computer 101 shown in FIG. 1 has received a proposed email from message source 151 (e.g., a computer that is used by an author of the email) that is intended for delivery to message receiver 153 (e.g., a computer that is known, such as by a lookup table, to be used by the person to whom the email is address).

In one or more embodiments of the present invention, one or more intended sentiments are ensured to comport with the actual and/or perceived sentiments of the recipient.

Thus, upon receiving the draft (proposed) mail, the computer 101 uses a lookup feature to determine the characteristics of the intended recipient of the message. In various embodiments of the present invention, this lookup feature describes traits (e.g., education, demographics, etc.) of the recipient, any past communications between the sender and the recipient (including the trend in tones or the communications), in order to predict sentiment interpretation. For example, if the author of the current email has exchanged several difficult (adversarial) emails with the recipient, then the recipient is likely to interpret otherwise innocuous passages as being also adversarial. As such, the system will take additional steps to replace inflammatory language with more congenial language, assuming that this is the intention of the author.

For example, and with reference to FIG. 2, assume that a proposed email to a recipient is shown in block 202. The proposed email states that the user is angry. However, the user may actually want the email to be even more aggressive, as shown in block 204, or to be less aggressive, as shown in block 206. The present invention determines which of the three options shown in FIG. 2 is to be used by consulting a set of rules, which determine which tone should be used.

For example, assume that a rule states "If previous emails have been adversarial, then make future emails less confrontational". If this is the rule that the system has been directed (e.g., by the author of the proposed email) to follow, then the system would 1) determine by a contextual analysis that the message in block 202 is too hostile, and will 2) modify the message in block 202 to create the message shown in block 206, by removing any "trigger words" such as "angry", and adding more conciliatory language (e.g., from a lookup table), such as "I understand your point".

Figure 3:
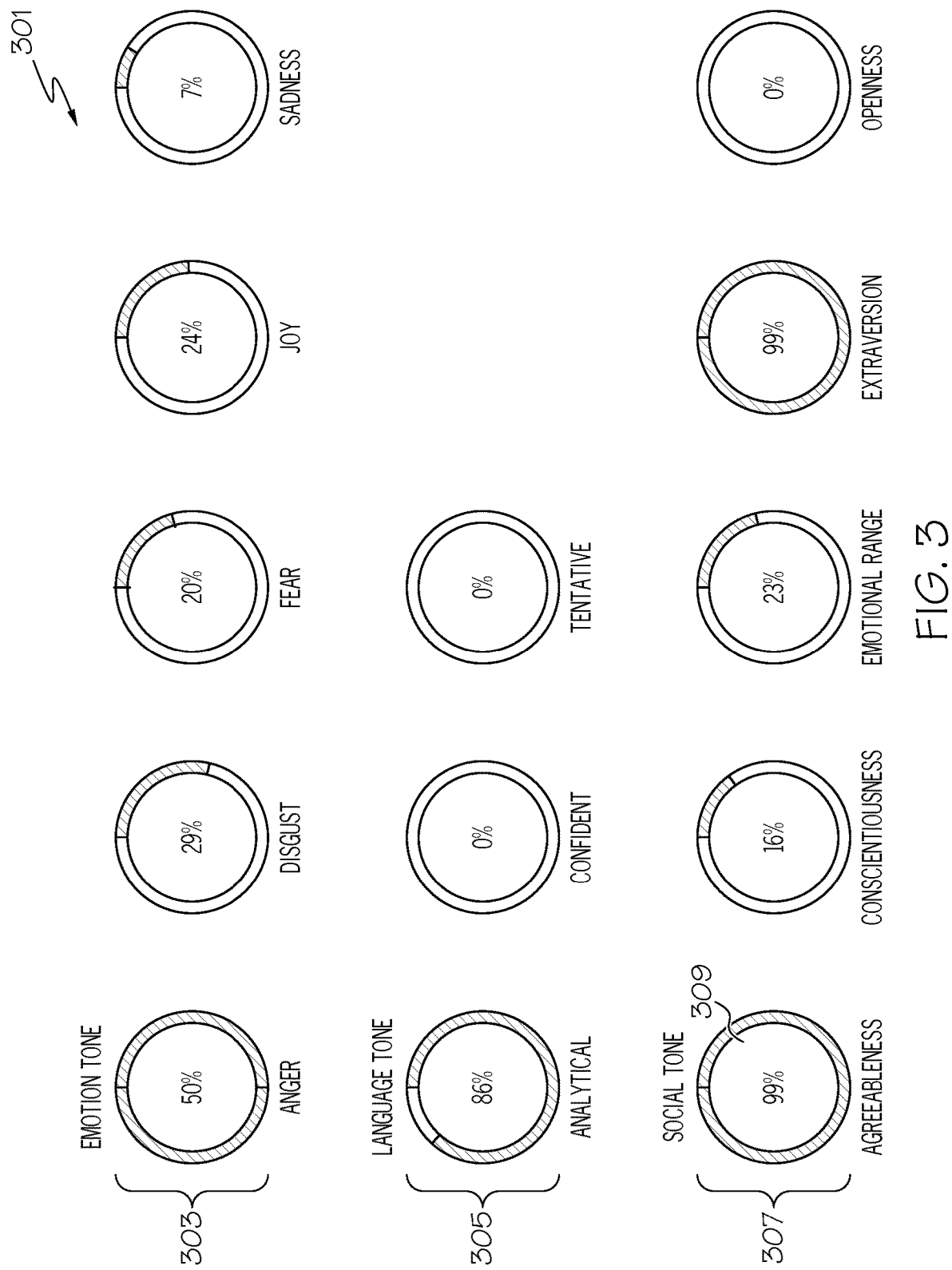
FIG. 3 depicts an exemplary tonal graph as utilized in accordance with one or more embodiments of the present invention.

As shown in tonal graph 301 in FIG. 3, the system evaluates one or more passages from the email according to emotion tones 303 (e.g., does the passage/text display a sense of anger, disgust, fear, joy, sadness, etc. from the author), language tones 305 (e.g., does the passage/text display a sense of the author being analytical, confident, tentative, etc.), and social tones 307 (e.g., does the passage/text display a sense of the author being agreeable, conscientious, emotional, extroverted, open, etc.). The tonal graph 301 is the result of the system (e.g., computer 101 shown in FIG. 1) identifying certain words or phrases that indicate one or more of these tones, and/or by conducting a contextual analysis (e.g., using natural language processing) that identifies the tones based on the meaning and context of the ideas found in the message.

As shown in FIG. 3, computer 101 has determined that a particular passage from the message and/or the entire message conveys a social tone that is highly (99%) agreeable, as shown in icon 309. That is, metrics based on terms used, contextual meaning, etc. of the message are quantified and/or weighted in order to derive a numerical score for how "agreeable" (i.e., non-confrontational, diplomatic, polite, etc.) the tone of the message is. However, in one or more embodiments the system determines that past communications from the author to the recipient have been adversarial, and thus the message is conveying an impression of sarcasm or weakness by being so agreeable. As such, the system will activate a down arrow 402, shown in FIG. 4 as part of icon 409 (analogous to icon 309 shown in FIG. 3 for the tone of "agreeable"), thus causing the passage (or the entire message) to be more aggressive in tone by altering it, as shown in block 204 in FIG. 2 (assuming that the passage in block 202 is too passive based on the past communication history with the intended recipient of the email).

Figure 4:
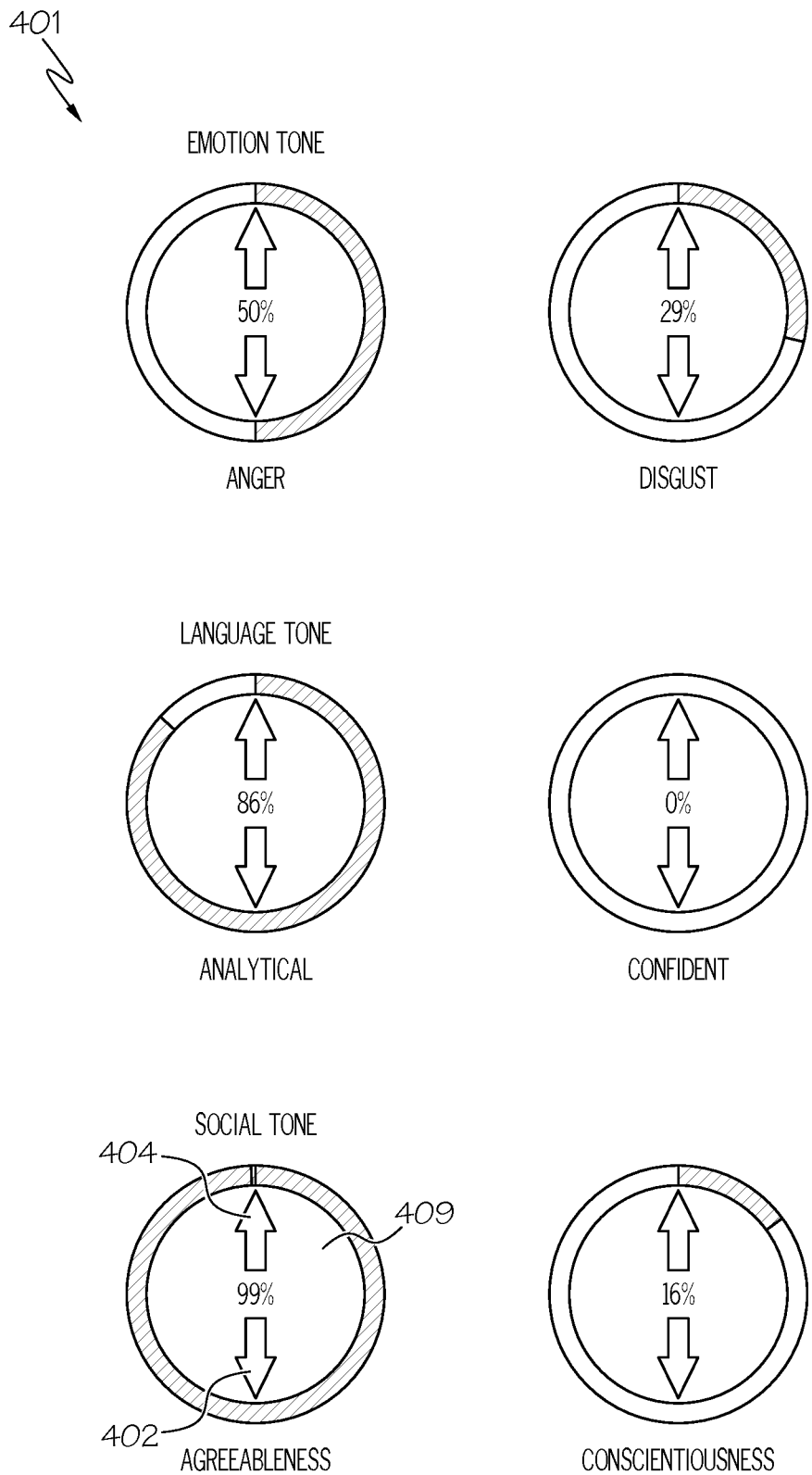
FIG. 4 illustrates exemplary control inputs on the tonal graph shown in FIG. 3.

In one or more embodiments, the system (e.g., computer 101) automatically takes actions indicated by the down arrow 402 shown in tonal graph 401 in FIG. 4. However, in another embodiment, the system waits to receive an input selecting the down arrow 402 from the author of the message, who has seen the 99% rating for agreeableness, and has determined that the passage and/or entire message needs to be less aggregable/affable. If the user were to activate the up arrow 404, then the agreeableness of the passage's tone would be increased the final 1% (e.g., to be completely agreeable).

In one or more embodiments, the present invention adjusts perceived message sentiment (i.e., the sentiment/tone of the message as perceived by the recipient) based on a change in the recipient's profile. For example, if recent interactions between the sender and recipient of the message have recently improved, then the rules direct the system to use language that is agreeable/affable, and thus do not change language in the message that led to the 99% agreeable rating as shown in icon 309 in FIG. 3.

In one or more embodiments, the present invention uses a machine learning mechanism to understand how different recipients perceive textual communication. That is, the system examines messages to similar types of recipients having similar communication exchanges, in order to understand how such recipients are likely to perceive the sentiment/tone of messages such as the proposed message currently being presented by the author/sender. This enables the system to understand and adjust portions of text in a message to match the intended sentiment of the sender and predicted perceived sentiment by the recipient.

In an embodiment of the present invention, a same message is originally proposed for being sent to multiple recipients. However, each of the multiple recipients has a different profile, a different history with the sender, etc. As such, in this embodiment the system generates a customized message (based on the original proposed message) that is appropriate for each or the different recipients, such that different language in the different customized messages will nonetheless cause each of the different recipients to have a same perception of the intended sentiment/tone of the author. Thus, the system adjusts the message so the intended sentiment matches the perceived sentiment of each specific recipient/group of recipients.

In an embodiment of the present invention, each version of the message is restricted to being transmitted on a particular communication sub-channel. For example, assume that a recipient of the message is a co-worker of the author of the message, and the author of the message routinely exchanges candid messages with the recipient about a project, including proprietary secret information. Assume that this type of message is the original message 502a shown in FIG. 5. Computer 501 (analogous to computer 101 shown in FIG. 1) sends message 502a to a message selector device 503, which includes logic for evaluating the sentiment/tone of message 502a, as well as evaluating rules for what type of sentiment/tone is acceptable for messages between co-workers. If the message selector 503 determines that the message 502a is appropriate/acceptable, then it will activate a sub-channel 505a (e.g., a secure channel that is inaccessible to the public) and send message 502a to the message receiver 553. However, if the message selector determines that the message 502a is not appropriate/acceptable, then it will take the amended message 502b (which has been created by computer 501 from message 502a, with the inappropriate sentiment/tone and/or terms/phrases changed or removed) and send it through a (less secure) sub-channel 505b to the message receiver 553. In an embodiment of the present invention, then the sub-channel 505b is reserved/dedicated to transmission of modified/amended messages, while sub-channel 505a is reserved/dedicated to transmission of original messages.

In one embodiment of the present invention, selection of a message (e.g., the original message or the amended message) developed by computer 101 (based on the original message received from message source 151) is achieved by a user of computer 101 activating a particular application found on a user interface (e.g., shown on display 109).

Figure 6:
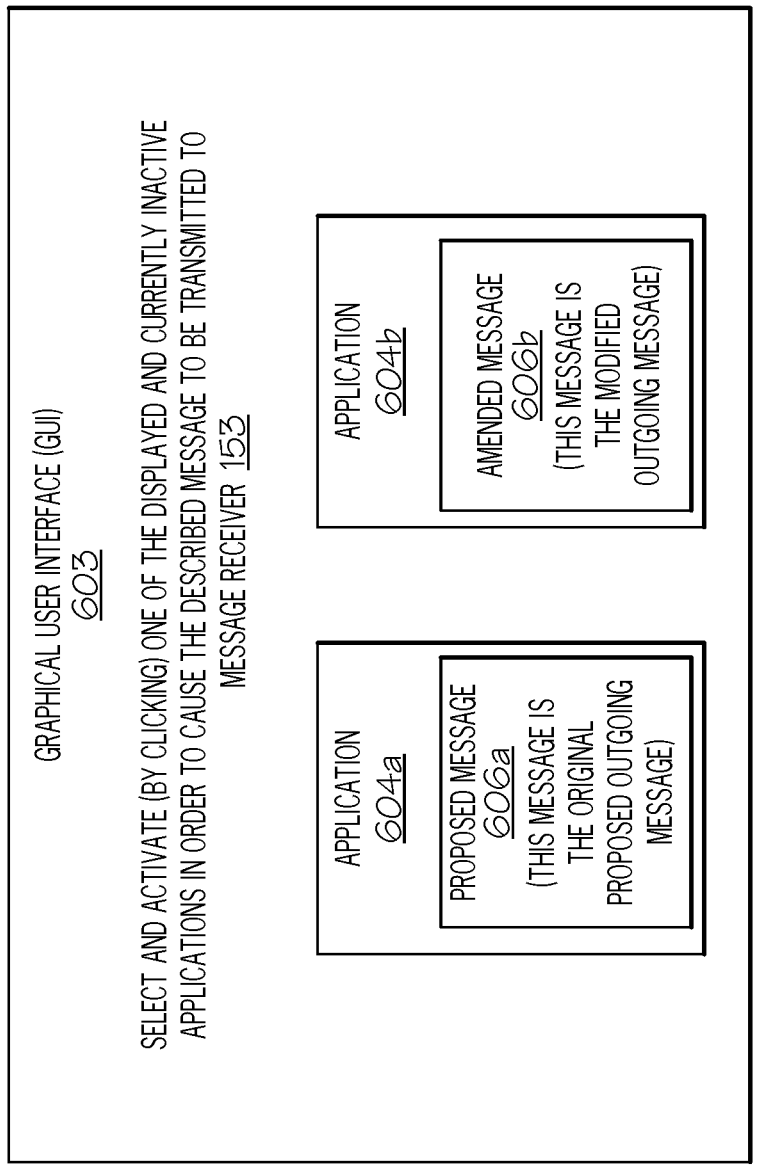
FIG. 6 depicts an exemplary graphical user interface (GUI) that allows a user of a client computer to activate an application that supplies a particular message for transmission in accordance with one or more embodiments of the present invention.

For example, consider now FIG. 6. As shown in FIG. 6, a graphical user interface (GUI) 603 on a display (e.g., display 109 shown in FIG. 1) displays two applications (application 604a and application 604b). Initially, both applications are in an unlaunchable state (i.e., are inactive until selected for activation by a user). However, associated with and displayed with application 604a is a description of proposed message 606a, which is the original message (e.g., email) that was created by the message author. When application 604a is activated/launched (by the user clicking on the block showing application 604a), application 604a will 1) retrieve the proposed message 606a (the original proposed outgoing message) 2) send content 606a to the message receiver 153 shown in FIG. 1. For example, and in one embodiment of the present invention, application 604a is an application that, upon being selected by the user by clicking the box showing application 604a on GUI 603, 1) obtains an internet protocol (IP) and/or a media access control (MAC) address used by the message receiver 153 (e.g., from a lookup table that identifies the IP or MAC address used by that particular content receiver 155 that is used by a particular type of target audience such as a toddler or a particular user); 2) establishes a communication session between computer 101 and message receiver 153; and then 3) sends content 606a via the Internet from the computer 101 to the message receiver 153.

If the user decides that he/she wants to send the amended message, then in one embodiment of the present invention application 604b is an application that, upon being selected by the user by clicking the box showing application 604b on GUI 603, 1) obtains an internet protocol (IP) and/or a media access control (MAC) address used by the message receiver 153 (e.g. through use of a lookup table); 2) establishes a communication session between computer 101 and message receiver 153; and then 3) sends content 606b (e.g., the modified outgoing message) via the Internet from the computer 101 to the message receiver 153.

In an embodiment of the present invention, application 604b uses another communication channel than that used by application 604a. For example, and in one embodiment of the present invention, application 604b is a wireless application that, upon being selected by the user by clicking the box showing application 604b on GUI 603, 1) obtains a cellular phone number used by the message receiver 153 (e.g., a "smart" phone); 2) establishes a telecommunication session between computer 101 and message receiver 153; and then 3) sends content 606b via the cellular network from the computer 101 to the message receiver 153.

Figure 7:
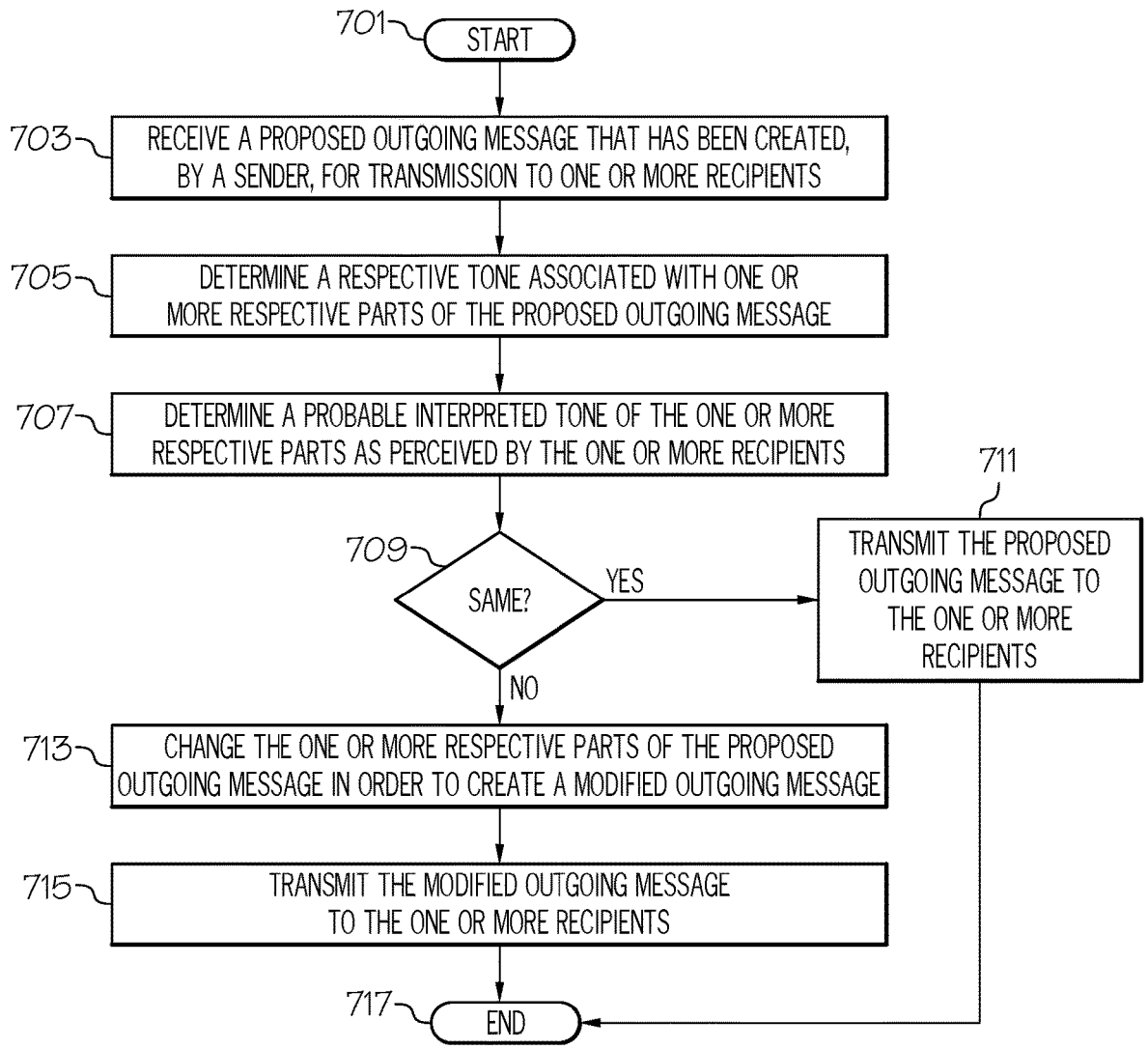
FIG. 7 is a high-level flow chart of one or more steps performed by one or more processors and/or other hardware devices in accordance with one or more embodiments of the present invention.

With reference now to FIG. 7, a high-level flow chart of one or more steps performed by one or more processors and/or other hardware devices in accordance with one or more embodiments of the present invention is presented.

After initiator block 701, a managing computer (e.g., computer 101 shown in FIG. 1) receives a proposed outgoing message (e.g., from message source 151 shown in FIG. 1) that has been created, by a sender, for transmission to one or more recipients (e.g., message receiver 153 shown in FIG. 1), as described in block 703.

As described in block 705, the managing computer determines a respective tone associated with one or more respective parts of the proposed outgoing message. That is, the managing computer evaluates one or more parts of the proposed outgoing message to determine what the tone is for each of these parts (see FIG. 3). As described herein, in one or more embodiments this evaluation is performed by identifying certain key words that indicate certain tones, and/or is performed by an NLP context analysis of the text.

As described in block 707, the managing computer determines a probable interpreted tone of the one or more respective parts as perceived by the one or more recipients. As described herein and in one or more embodiments of the present invention, this determination is based on past communications between the sender and named recipient of the proposed message, a relationship between the sender and named recipient (e.g., employer/employee, vendor/customer, etc.), etc.

As described in query block 709, a determination is as to whether there is a difference between the respective tone (i.e., what the system determines the tone/sentiment to actually be) and the probable interpreted tone (i.e., what the recipient will interpret the tone/sentiment to be) for the one or more respective parts of the proposed outgoing message. That is, based on the profile, history, etc. of the recipient, the system will predict how that recipient will perceive the tone/sentiment of the message, and will compare that perceived tone/sentiment with what the actual tone of what the author wrote. The actual tone of what the author wrote is based on an objective analysis (e.g., based on what terms are used in the message, a contextual analysis of the message, etc.).

If the actual tone/sentiment of the message and the predicted perceived tone/sentiment of the message are the same (query block 709), then the managing computer simply transmits the original proposed outgoing message to the one or more recipients (block 711), and the flow chart ends (terminator block 717).

However, if the actual tone/sentiment of the message and the predicted perceived tone/sentiment of the message are different (query block 709), then the managing computer changes the one or more respective parts of the proposed outgoing message in order to create a modified outgoing message, as described in block 713. Thus, the modified outgoing message is modified such that the probable interpreted tone for the one or more recipients of the modified outgoing message matches a sender-intended tone of the one or more respective parts of the outgoing message.

As described in block 715, the managing computer then transmits the modified outgoing message to the one or more recipients, and the flow-chart ends at terminator block 717.

As described herein, in an embodiment of the present invention, the sender-intended tone is based on a profile of the sender, a topic of the proposed outgoing message, and activities associated between the sender and the recipient prior to the sender creating the proposed outgoing message. That is, the tone that the author/sender intends for the message to convey is based on the profile of the sender (e.g., a vendor may intend for the message to convey a different tone than a customer); a topic of the proposed outgoing message (e.g., a message about a social event is likely to require a different tone than a business transaction message); and/or activities associated between the sender and the recipient prior to the sender creating the proposed outgoing message (e.g., if the sender and the recipient have an adversarial history, then the tone of the message will be different than if they have a non-adversarial history).

In an embodiment of the present invention, the probable interpreted tone is based on one or more of a recipient list for the proposed outgoing message, recipient roles of the one or more recipients, recipient locations of the one or more recipients, recipient ages of the one or more recipients, and recipient profile attributes of the one or more recipients. That is, the system will determine what the likely perception of the tone of the message is based on who the recipient of the message is (recipient list for the proposed outgoing message); what role (e.g., vendor or customer) the recipient has; where the recipient is physical located (e.g., a recipient in a certain country is likely to have cultural differences than recipients in another country, thus resulting in different perceptions of the tone of the message); ages of the one or more recipients (e.g., different ages are likely to have different perceptions of the tone, based on popular culture references, experiences, etc.); and/or profile attributes (e.g., character traits) of the one or more recipients.

As described in FIG. 4, in an embodiment of the present invention the managing computer presents a tonal graph (e.g., tonal graph 301 shown in FIG. 3 and/or tonal graph 401 shown in FIG. 4) that describes components of the respective tone that caused the difference between the respective tone and the probable interpreted tone. The managing computer then receives a sender input to the tonal graph (e.g., the user selecting the down arrow 402 shown in FIG. 4), and then changes the one or more respective parts of the proposed outgoing message based on a received sender input to the tonal graph in order to create the modified outgoing message.

In an embodiment of the present invention, the received sender input to the tonal graph (e.g., clicking on the down arrow 402 shown in FIG. 4) causes a change to the proposed outgoing message that selectively increases (up arrow 404) or decreases (down arrow 402) one or more of the components of the respective tone.

In an embodiment of the present invention, a same original proposed outgoing message is used as the basis for multiple different amended messages, where each of the different amended messages is tailored to a particular recipient based on that recipient's traits. Thus, in an embodiment in which there are multiple recipients of the message, the managing computer creates a separate modified outgoing message for each of the multiple recipients based on the probable interpreted tone of the proposed outgoing message for each of the multiple recipients, and then transmits each separate modified outgoing message to a respective recipient from the multiple recipients.

As described in FIG. 6, in an embodiment of the present invention the message (either in its original form or in its modified form) is selectively sent according to an association with a particular application, which is presented on a GUI and is initially in an unlaunchable form until activated by the user. Thus, the managing computer displays a description of the proposed outgoing message on a user interface that displays a first application (e.g., application 604*a* shown in FIG. 6), where the proposed outgoing message is only capable of being transmitted by the first application, and wherein the first application is initially in a first unlaunchable state while being displayed on the user interface. The managing computer also displays a description of the modified outgoing message on the user interface as the user interface displays a second application (e.g., application 604*b*), where the modified outgoing message is only capable of being transmitted by the second application, and wherein the second application is initially in a second unlaunchable state while being displayed on the user interface. The managing computer receives a user selection of the second application, and then executes the second application, such that executing the second application causes the modified outgoing message to be transmitted to the one or more recipients.

Figure 5:
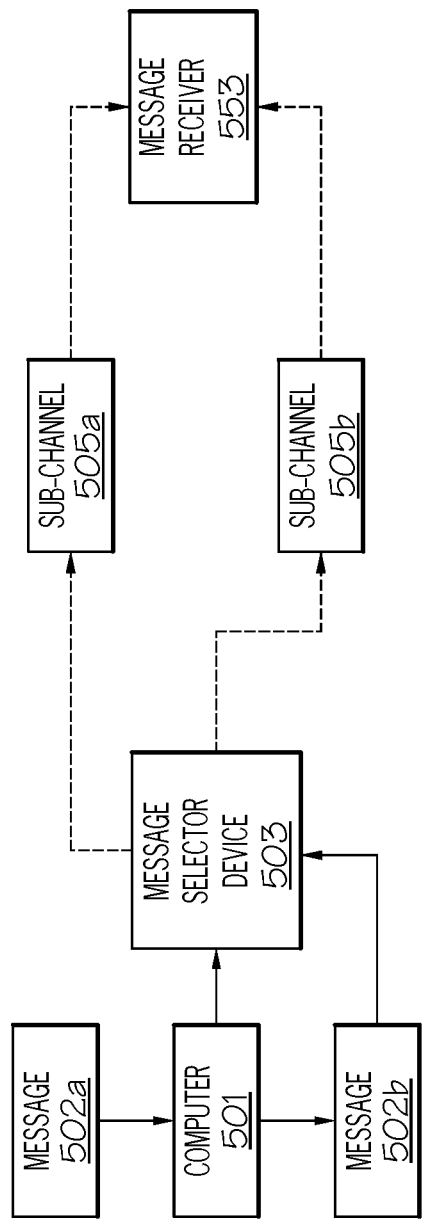
FIG. 5 depicts an exemplary system that utilizes selectable transmission sub-channels in accordance with one or more embodiments of the present invention.

In an embodiment of the present invention, and as described in FIG. 5, the proposed outgoing message is transmitted on a first sub-channel (e.g., sub-channel 505*a*) in a messaging system. The managing computer disables the first sub-channel in the messaging system, and activates a second sub-channel (e.g., sub-channel 505*b*) in the messaging system, which is devoted to transmitting altered messages. The managing computer then transmits the modified outgoing message on the second sub-channel to the one or more recipients (e.g., message receiver 553 shown in FIG. 5).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). It In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
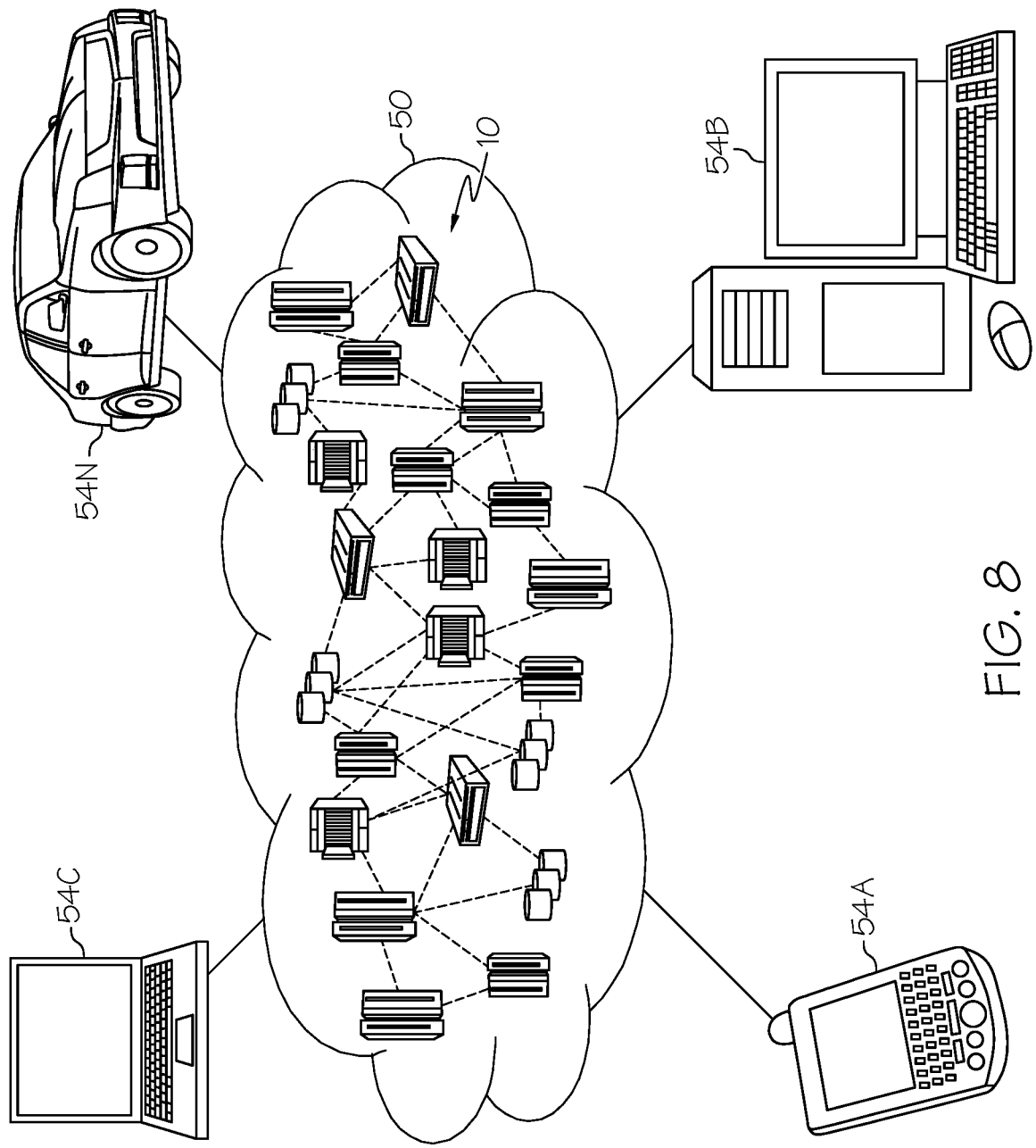
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
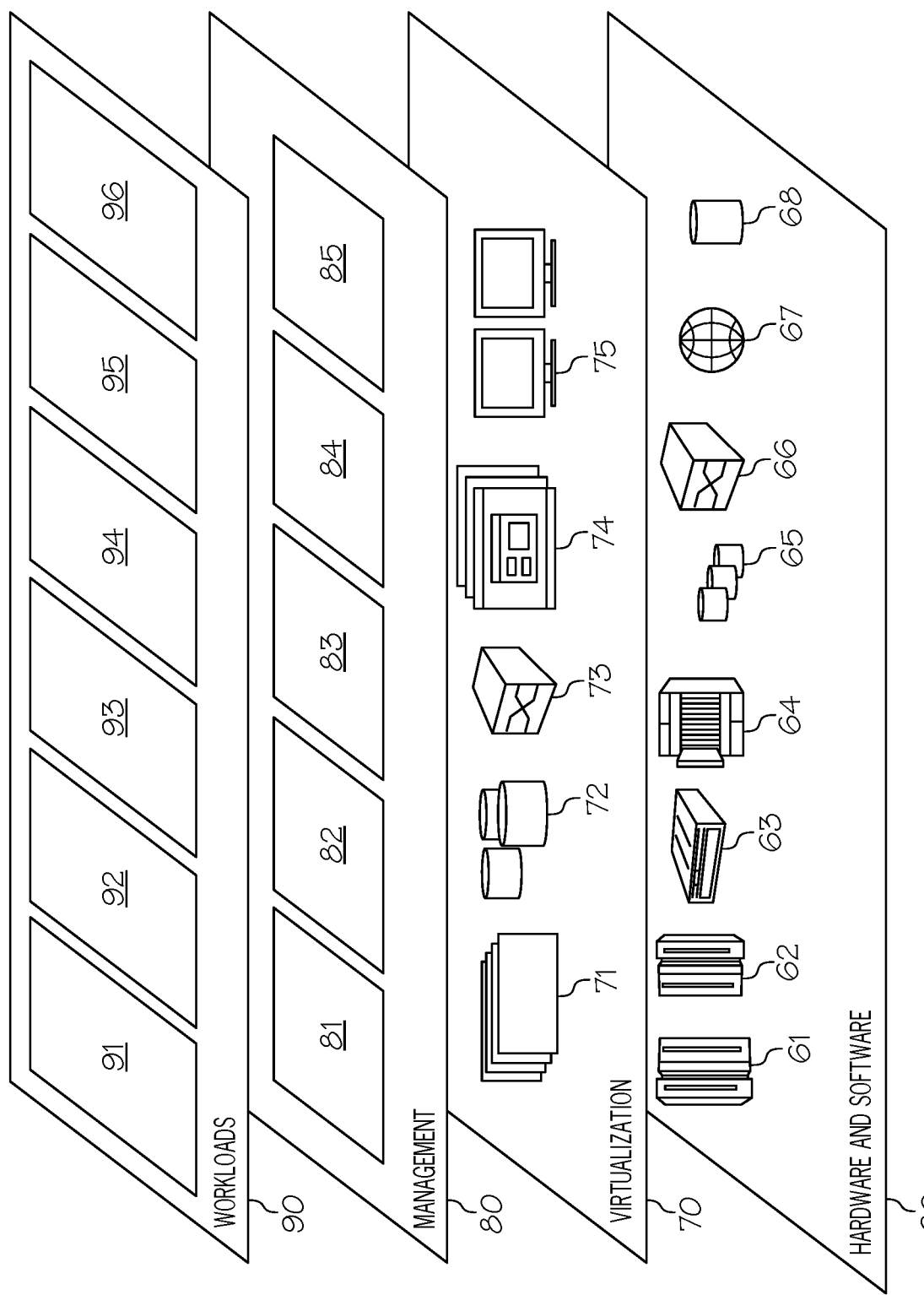
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and message modification and transmission control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by a managing computer, proposed outgoing messages that have been created, by a sender, for transmission to multiple recipients;
   determining, by the managing computer, a respective tone associated with one or more respective parts of the proposed outgoing messages;
   determining, by the managing computer, a probable interpreted tone of the one or more respective parts of the proposed outgoing messages as perceived by the multiple recipients;
   in response to determining a difference between the respective tone and the probable interpreted tone for the one or more respective parts of the proposed outgoing messages, changing, by the managing computer, the one or more respective parts of the proposed outgoing messages in order to create a separate modified outgoing message for each of the multiple recipients based on the probable interpreted tone of the proposed outgoing messages for each of the multiple recipients, wherein the probable interpreted tone for each of the multiple recipients of the modified outgoing messages matches a sender-intended tone of the one or more respective parts of each separate modified outgoing message; and
   transmitting, by the managing computer, each separate modified outgoing message to a respective recipient from the multiple recipients.

2. The method of claim 1, further comprising:
   presenting, by the managing computer and to the sender, a tonal graph that describes components of the respective tone that caused the difference between the respective tone and the probable interpreted tone;
   receiving, by the managing computer, a sender input to the tonal graph; and
   changing, by the managing computer, the one or more respective parts of the proposed outgoing messages based on a received sender input to the tonal graph in order to create the modified outgoing messages.

3. The method of claim 2, wherein the received sender input to the tonal graph causes a change to the proposed outgoing messages that selectively increases or decreases one or more of the components of the respective tone.

4. The method of claim 1, wherein the sender-intended tone is based on a profile of the sender, topics of the proposed outgoing messages, and activities associated between the sender and the multiple recipients prior to the sender creating the proposed outgoing messages.

5. The method of claim 1, wherein the probable interpreted tone is based on one or more of a recipient list for the proposed outgoing messages, recipient roles of the multiple recipients, recipient locations of the multiple recipients, recipient ages of the multiple recipients, and recipient profile attributes of the multiple recipients.

6. The method of claim 1, wherein the probable interpreted tone is based on a preceding set of communications between the sender and the multiple recipients.

7. The method of claim 1, further comprising:
   displaying, by the managing computer, a description of the proposed outgoing messages on a user interface that displays a first application, wherein the proposed outgoing messages are only capable of being transmitted by the first application, and wherein the first application is initially in a first unlaunchable state while being displayed on the user interface;
   displaying, by the managing computer, a description of the proposed modified outgoing messages on the user interface as the user interface displays a second application, wherein the proposed modified outgoing messages are only capable of being transmitted by the second application, and wherein the second application is initially in a second unlaunchable state while being displayed on the user interface;
   receiving, by the managing computer, a user selection of the second application; and
   executing, by the managing computer, the second application, wherein executing the second application causes the proposed modified outgoing messages to be transmitted to the one or more recipients.

8. The method of claim 1, wherein the proposed modified outgoing messages are transmitted on a first sub-channel in a messaging system, and wherein method further comprises:
   disabling, by the managing computer, the first sub-channel in the messaging system;

activating, by the managing computer, a second sub-channel in the messaging system, wherein the second sub-channel is reserved for transmission of proposed modified outgoing messages; and transmitting, by the managing computer, the proposed modified outgoing messages on the second sub-channel to the multiple recipients.

9. A computer program product comprising a non-transitory computer readable storage device having program instructions embodied therewith, the program instructions readable and executable by a computer to perform a method comprising:

receiving a proposed outgoing message that has been created, by a sender, for transmission to one or more recipients;

determining a respective tone associated with one or more respective parts of the proposed outgoing message;

determining a probable interpreted tone of the one or more respective parts as perceived by the one or more recipients;

in response to determining a difference between the respective tone and the probable interpreted tone for the one or more respective parts of the proposed outgoing message, changing the one or more respective parts of the proposed outgoing message in order to create a modified outgoing message, wherein the probable interpreted tone for the one or more recipients of the modified outgoing message matches a sender-intended tone of the one or more respective parts of the modified outgoing message;

transmitting the modified outgoing message to the one or more recipients;

displaying a description of the proposed outgoing message on a user interface that displays a first application, wherein the proposed outgoing message is only capable of being transmitted by the first application, and wherein the first application is initially in a first unlaunchable state while being displayed on the user interface;

displaying a description of the modified outgoing message on the user interface as the user interface displays a second application, wherein the modified outgoing message is only capable of being transmitted by the second application, and wherein the second application is initially in a second unlaunchable state while being displayed on the user interface;

receiving a user selection of the second application; and executing the second application, wherein executing the second application causes the modified outgoing message to be transmitted to the one or more recipients.

10. The computer program product of claim 9, wherein the method further comprises:

presenting, to the sender, a tonal graph that describes components of the respective tone that caused the difference between the respective tone and the probable interpreted tone;

receiving a sender input to the tonal graph; and changing the one or more respective parts of the proposed outgoing message based on a received sender input to the tonal graph in order to create the modified outgoing message.

11. The computer program product of claim 10, wherein the received sender input to the tonal graph causes a change to the proposed outgoing message that selectively increases or decreases one or more of the components of the respective tone.

12. The computer program product of claim 9, wherein the one or more recipients are multiple recipients, and wherein the method further comprises:

creating a separate modified outgoing message for each of the multiple recipients based on the probable interpreted tone of the proposed outgoing message for each of the multiple recipients; and transmitting each separate modified outgoing message to a respective recipient from the multiple recipients.

13. The computer program product of claim 9, wherein the proposed outgoing message is transmitted on a first sub-channel in a messaging system, and wherein method further comprises:

disabling the first sub-channel in the messaging system;

activating a second sub-channel in the messaging system, wherein the second sub-channel is reserved for transmission of modified messages; and transmitting the modified outgoing message on the second sub-channel to the one or more recipients.

14. The computer program product of claim 9, wherein the program instructions are provided as a service in a cloud environment.

15. A computer system comprising one or more processors, one or more computer readable memories, one or more computer readable storage mediums, and program instructions stored on at least one of the one or more computer readable storage mediums for execution by at least one of the one or more processors via at least one of the one or more computer readable storage memories to perform a method comprising:

receiving a proposed outgoing message that has been created, by a sender, for transmission to one or more recipients;

determining a respective tone associated with one or more respective parts of the proposed outgoing message;

determining a probable interpreted tone of the one or more respective parts as perceived by the one or more recipients;

in response to determining a difference between the respective tone and the probable interpreted tone for the one or more respective parts of the proposed outgoing message, changing the one or more respective parts of the proposed outgoing message in order to create a modified outgoing message, wherein the probable interpreted tone for the one or more recipients of the modified outgoing message matches a sender-intended tone of the one or more respective parts of the modified outgoing message;

transmitting the modified outgoing message to the one or more recipients;

displaying a description of the proposed outgoing message on a user interface that displays a first application, wherein the proposed outgoing message is only capable of being transmitted by the first application, and wherein the first application is initially in a first unlaunchable state while being displayed on the user interface;

displaying a description of the modified outgoing message on the user interface as the user interface displays a second application, wherein the modified outgoing message is only capable of being transmitted by the second application, and wherein the second application is initially in a second unlaunchable state while being displayed on the user interface;

receiving a user selection of the second application; and executing the second application, wherein executing the second application causes the modified outgoing message to be transmitted to the one or more recipients.

16. The computer system of claim 15, wherein the method further comprises:

presenting, to the sender, a tonal graph that describes components of the respective tone that caused the difference between the respective tone and the probable interpreted tone;

receiving a sender input to the tonal graph; and changing the one or more respective parts of the proposed outgoing message based on a received sender input to the tonal graph in order to create the modified outgoing message.

17. The computer system of claim 15, wherein the computer system is provided as a service in a cloud environment.

* * * * *